Dec. 18, 1951      W. T. BROWN      2,579,294
METHOD OF MAKING ATHLETIC BALLS
Original Filed Aug. 31, 1944      2 SHEETS—SHEET 1
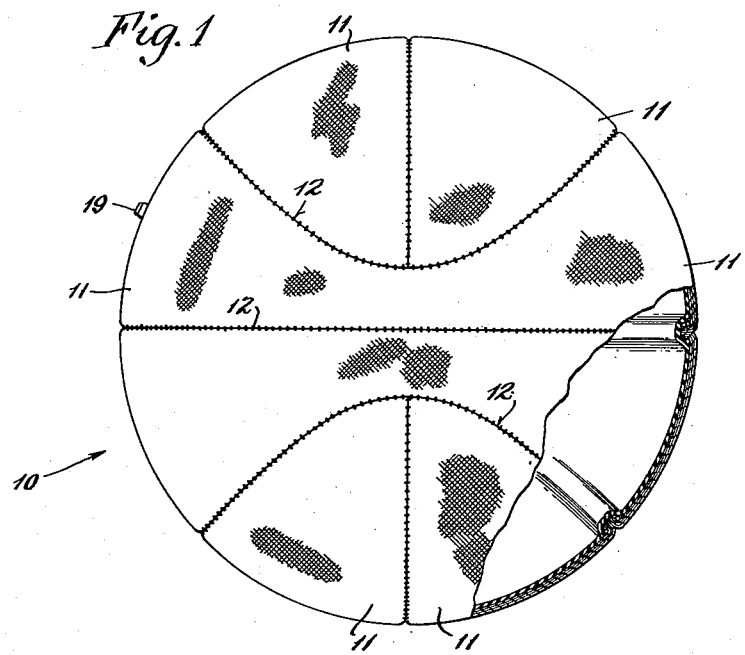
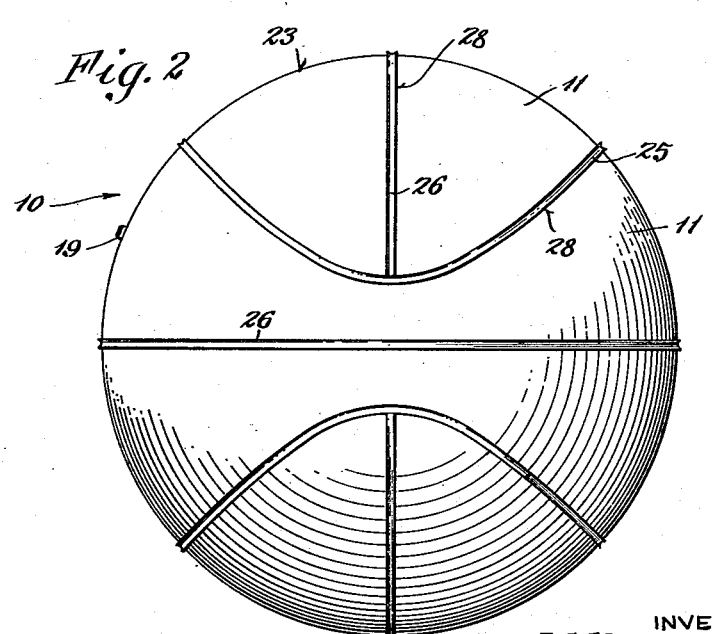
INVENTOR
William T. Brown
BY Johnson and Kline
ATTORNEYS Dec. 18, 1951 W. T. BROWN 2,579,294
METHOD OF MAKING ATHLETIC BALLS
Original Filed Aug. 31, 1944 2 SHEETS—SHEET 2
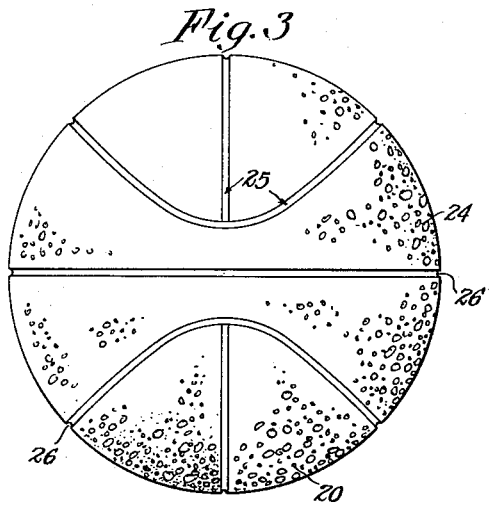
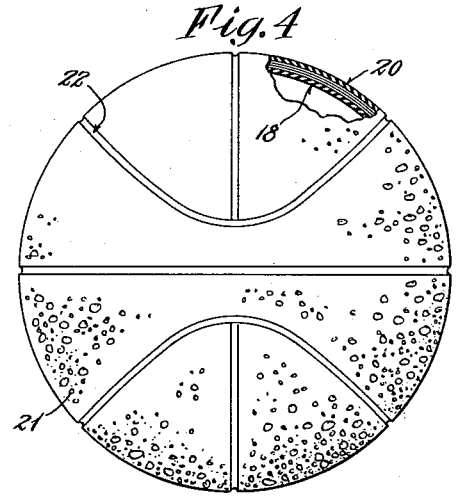
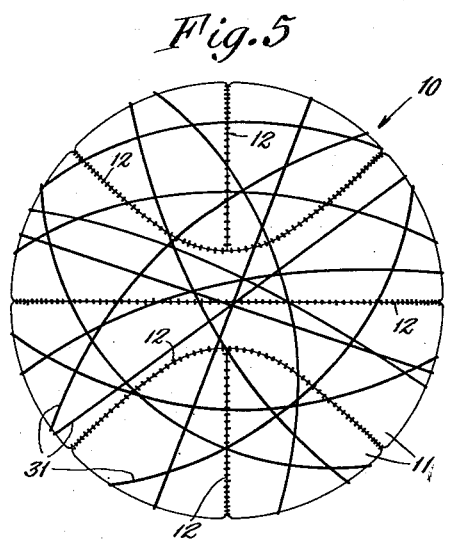
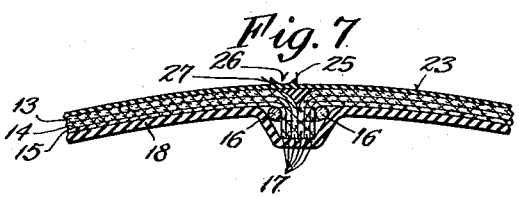
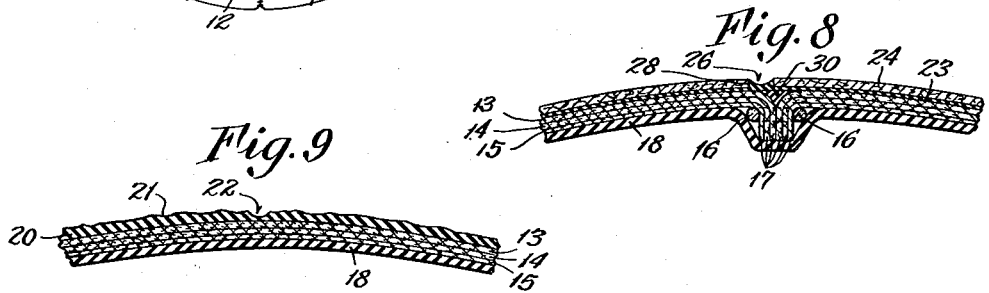
INVENTOR
William T. Brown
BY Johnson and Kline
ATTORNEYS Patented Dec. 18, 1951

2,579,294

UNITED STATES PATENT OFFICE 2,579,294

METHOD OF MAKING ATHLETIC BALLS

William T. Brown, West Suffield, Conn., assignor to A. G. Spalding & Bros. Inc., Chicopee, Mass., a corporation of Delaware Original application August 31, 1944, Serial No. 552,089. Divided and this application August 14, 1945, Serial No. 610,825

2 Claims. (Cl. 154—16)

This invention relates to the method of making athletic balls, such as footballs, volley balls, and basket balls.

Many persons are deprived of the pleasure and exercise to be had from playing games involving the use of athletic balls because regulation balls, which are built for the extremely hard usage of tournaments or matches, are too expensive for the relatively limited use such persons would make of such balls. Very cheap balls are not satisfactory because they are too light and too flimsy, or have too much or too little rebound to permit or require the use of skill comparable with that of regulation balls.

To supply this need, it is an object of the present invention to provide a method of producing a utility ball which may be made and sold at a price substantially lower than a regulation ball, and yet which will handle and perform quite like the latter, being generally satisfactory for other than tournament or match use.

This is accomplished, according to the present invention, by utilizing, for the main body of the ball, fabric sections which would, in a regulation ball, constitute the lining for the leather body, and covering the fabric body with a relatively thin coating of rubber cured and vulcanized on the body while the latter is inflated in a mold.

Preferably, the fabric body is made of a plurality of pieces of cloth secured together adhesively to form a laminated ply from which the sections of desired or conventional shape may be cut to be sewed together. The adhesive may constitute uncured rubber cement impregnating the cloth so that when the rubber covering is cured in the mold, the cement in the cloth will also be cured and the laminated cloth structure will become bonded to the rubber coating. The laminated cloth sections may advantageously include one layer of cotton twill, an intermediate layer of heavy muslin or light canvas, and an outer layer of cotton twill.

In the building the body of the ball, the same equipment is used and the same procedure is followed as in making a regulation ball, except that the fabric sections are sewed together omitting the leather pieces which are used in a regulation ball leaving a short seam unsewed. After the sections are sewed together, the body is turned inside out through the opening so that the seams are on the inside, the bladder is inserted through the opening, and its valve is secured in place, and then the open seam is closed by hand sewing. The stitches by which the sections are joined are so disposed with relation to the edges of the pieces that when the bladder is inflated the fabric body will have substantially the size and shape of a regulation ball.

The body is then provided with a layer of uncured rubber which may be wound about the body in tape form, and then the body is put in a mold where the rubber is vulcanized or cured, and the body, or at least the outer lamination thereof, is bonded to the rubber coating.

According to the present invention, the coating is relatively thin, being no thicker than the thickness of the laminated fabric sections, and the external surfaces of the rubber coating may have lines and indentations to simulate the appearance and feel of leather and valleys such as are produced when two pieces of leather are stitched together and turned inside out, thus providing surfaces very similar to the surfaces of a regulation ball which permits the ball to be gripped.

If the body is provided with a substantially uniform layer of uncured rubber, when it is placed in the mold the finished coating will show the valleys existing at the seams of the body. Hence, to avoid the necessity of aligning these valleys with the valley-producing ribs on the mold, it is preferable that the valleys in the body be filled with rubber composition before the layer of uncured rubber is applied to the ball. For this purpose, a tacky cord-like rubber strip may be placed in the valleys before the uncured rubber is applied to the body.

If desired, at slightly increased cost, the ball may be made more nearly like the regulation ball by cementing thin leather sections or slices on the exterior of the rubber coating. If this is to be done, the main portion of the rubber coating is made extremely thin—say, on the order of the thickness of one of the plies of the fabric strip—so that the rubber and the thin leather will substantially equal the thickness of the plies of fabric sections, in other words, the thickness of the all rubber coating.

In making this leather covered ball, channel ribs are molded on the rubber at the places where the seams would appear and these ribs are of such height as to be flush with and abut against the edges of the cemented-on leather sections.

Other features and advantages will hereinafter appear.

In the accompanying drawings which illustrate several embodiments of the present invention—

Figure 1 shows the exterior of the body of a spherical ball made according to the method of the present invention, part of the ball being shown in section and showing the bladder within the ball.

Fig. 2 shows the exterior of the ball shown in Fig. 1, after it has had its rubber coating molded thereon, the ball illustrated being of the type in which leather sections are cemented onto the rubber coating.

Fig. 3 shows the ball shown in Fig. 2, with the leather sections secured in place thereon.

Fig. 4 shows a spherical ball of the present invention in which there are no leather sections used, the rubber covering being made thicker and having indentations to simulate the appearance of leather sections, a portion of the ball being shown in section to show the relation between the bladder, the fabric body, and the rubber coating.

Fig. 5 shows the body of a spherical ball made according to the present invention on which is wrapped cords which may be used to reenforce the ball if desired.

Fig. 6 is a section on a large scale, showing the body stitched together, the bladder within the body, and the filler for the valley caused by the seam.

Fig. 7 is a view similar to Fig. 6, showing the rubber cover molded in place and illustrating the channeled rib providing abutments for the edge of leather strips to be applied to the covering.

Fig. 8 is like Fig. 7, but shows the leather strips cemented in place.

Fig. 9 is a sectional view of a ball in which no leather strips are employed, the rubber coating being somewhat thicker than the major portion of the rubber coating in the ball shown in Figs. 6, 7 and 8.

As shown in the accompanying drawings, the body 10 of the ball is made up of a plurality of sections 11 which are so shaped and sewed together along seams 12 as to produce a spherical body. According to the present invention, the sections 11 are made up of a plurality of plies of fabric. Preferably, the outer ply 13 is made of cotton twill, the intermediate ply 14 is made of heavy muslin or canvas, and the inner ply 15 is made of cotton twill. Pieces of such material are adhesively secured together, preferably by a rubber cement, and are cut to shape according to established ball-making practices and the particular shape ball wanted, and these are sewed together along adjacent edges by stitching 16 in the same manner and with the same machinery as would be used in the manufacture of a regulation fabric lined leather ball. The stitching is so placed with relation to the edges 17 of the ply of fabric strips that when the body is inflated it will have substantially the size and shape of a regulation ball of the same kind. After the fabric strips are secured together, except for a slit which is left open, the body is turned inside out, a bladder 18 is inserted in the slit, and a valve 19 is cemented in place. After the body is inflated, it is wrapped with strips of uncured rubber and placed in a mold where the rubber is vulcanized and cured and formed into a skin or coating 20. If the exterior of the ball is to be of rubber as is illustrated in Fig. 4, it is preferable that the mold be so made as to produce embossings 21 on the outer surface of the ball in imitation of the grain of leather, and also valleys 22 in imitation of the valleys formed at the seams of the leather strips of regulation balls.

The rubber coating 20 is preferably no thicker than the laminated fabric body sections 11, and when so made the ball will have weight, appearance, feel and action sufficiently close to those characteristics of a regulation ball to permit the ball to be used with satisfaction for other than tournament or match purposes.

If desired, the ball may have on its exterior thin and comparatively inexpensive leather strips cemented to the rubber coating as shown in Fig. 3. In this event, the rubber coating 23 is made extremely thin, approximately as thick as one layer of the laminated fabric plies, and the leather strips 24, (see Fig. 8) are cemented to the rubber coating 23—the leather and the rubber together being approximately the thickness of the fabric plies. To facilitate the positioning of the leather strips and to provide valleys forming hand grips as in a leather ball, the rubber coating 23 is, in the molding thereof, provided with ribs 25 having valleys or channels 26, and the side edges 27 of these ribs provide abutments for the side edges 28 of the leather sections.

If the fabric pieces are secured together in laminated form by a rubber cement, the latter will be cured and the pieces will be bonded together and to the rubber coating 20 or 23 when the latter is cured and formed in the mold. In this way, all portions of the rubber coating are held tightly against the fabric body, and in playing the ball, the danger of the cover being pierced and ripped off is reduced to a minimum.

In molding the coating on the ball, if the seams between the fabric sections are not located directly under the channel producing ribs on the mold so that the valley produced by the seam and the valley produced in the mold do not coincide, an unwanted groove or valley will appear on the surface of the ball. This will show in the case of an all rubber covered ball shown in Figs. 4 and 9 and thus be undesirable. In the case of the ball covered with leather sections, the depressed portions of the rubber coating may not contact with the leather piece, and therefore leave a portion of the leather not cemented down and free to be ripped off.

To avoid this, the present invention provides a filler 29 which may be in the form of an extruded or otherwise provided string of tacky rubber which is placed in the valley caused by the junction of the fabric at the seam before the ball is wrapped with the strips of uncured rubber which are to make up the coating. Thus, when the ball is molded, the strip will become plastic and nicely fill the valley caused by the seam as shown at 30 in Fig. 8.

In the event that the body may be made of lighter grade materials with economy, it may be found desirable to employ such lighter weight material and wrap the body with reenforcing cords 31 as shown in Fig. 5.

I have found that a satisfactory ball for the purpose described may be made by employing for the body of the ball a laminated pile approximately .061" thick of which the inside and outside twill layers may be .022" while the intermediate muslin layer may be .017" thick. Where the body is to be covered merely by a layer or coating of rubber, the rubber may be approximately .036" thick, and where the thin leather strips are to be used the rubber coating may be .012" thick. The thickness and grade of leather will vary considerably, and may be between .030" and .060" thick. It should be understood, of course, that the figures above given are simply by way of example, and may vary within wide limits according to the individual choice and judgment.

Thus it will be seen that the body of the ball is made by a novel combination of known methods with which ball makers are familiar and with the machinery at hand, and may have the coating of rubber or rubber and thin leather provided with very little special skill or expense.

Although the ball of the present invention is primarily intended as a utility ball, it should be understood that it may be used for tournaments and matches, if desired, and if agreeable to the contestants or the officials conducting such tournaments and matches.

Variations and modifications may be made within the scope of this invention and portions of the improvements may be used without others.

This application is a division of application Serial No. 552,089, filed August 31, 1944, now abandoned.

I claim:

1. The herein described method of making an athletic ball which includes the steps of adhering together plies of fabric, making a fabric body of laminated fabric pieces sewed together with their inturned edges in face to face relation so that when filled out the body is substantially the size and shape of a finished regulation size and shape ball, laying in a preformed filler strip of rubber in the valley formed in the outer surface by the inturned edges, and molding on the body when inflated a coating of rubber to waterproof the body and protect it against abrasion.

2. The herein described method of making an athletic ball which includes the steps of impregnating and adhesively securing together a plurality of layers of textile fabric with a rubbery cementitious material, cutting out ball sections from said fabric; sewing said sections together in face to face relation to form a ball body; inverting the body; inserting a bladder and inflating the body; overlaying the valley formed by the seams with a tacky strip of rubber; covering the inflated body with a layer of rubber; and vulcanizing the covered body in a mold to bond together the fabric impregnated with the rubbery cementitious material and the rubber layer into a ball casing, the tacky strip becoming plastic during the molding operation and filling the valley to completely conceal the same.

WILLIAM T. BROWN.

REFERENCES CITED

The following references are of record in the file of this patent:

UNITED STATES PATENTS

| Number | Name | Date |
|---|---|---|
| 2,061,604 | Winterbauer | Nov. 24, 1936 |
| 2,091,455 | Riddell | Aug. 31, 1937 |
| 2,149,465 | Riddell | Mar. 7, 1939 |

FOREIGN PATENTS

| Number | Country | Date |
|---|---|---|
| 17,376 | Australia | Jan. 30, 1935 |